(12) United States Patent
Hirakata

(10) Patent No.: US 8,281,822 B2
(45) Date of Patent: Oct. 9, 2012

(54) IN-VEHICLE HYDROGEN STORAGE APPARATUS

(75) Inventor: Shuji Hirakata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 404 days.

(21) Appl. No.: 12/374,221

(22) PCT Filed: Jul. 19, 2007

(86) PCT No.: PCT/IB2007/002048
§ 371 (c)(1),
(2), (4) Date: Jan. 16, 2009

(87) PCT Pub. No.: WO2008/012630
PCT Pub. Date: Jan. 31, 2008

(65) Prior Publication Data
US 2009/0308489 A1    Dec. 17, 2009

(30) Foreign Application Priority Data

Jul. 20, 2006   (JP) ................................. 2006-197941

(51) Int. Cl.
*B65B 3/04* (2006.01)

(52) U.S. Cl. ............. 141/104; 141/69; 141/95; 141/192

(58) Field of Classification Search ................ 141/4, 9, 141/11, 37, 63, 69, 82, 94, 95, 104–105, 141/192, 197, 227; 62/49.1, 49.2, 50.4
See application file for complete search history.

(56) References Cited

U.S. PATENT DOCUMENTS

| | | | |
|---|---|---|---|
| 5,133,391 A * | 7/1992 | Johansson et al. ................ 141/1 |
| 5,987,895 A * | 11/1999 | Nishimura et al. ............ 62/46.2 |
| 7,059,364 B2 * | 6/2006 | Kountz et al. ..................... 141/4 |
| 7,363,949 B2 * | 4/2008 | Kubo et al. ...................... 141/82 |
| 2001/0047621 A1 * | 12/2001 | Arnold ............................ 48/195 |
| 2010/0003559 A1 * | 1/2010 | Hirakata ......................... 429/22 |
| 2010/0101306 A1 * | 4/2010 | Suematsu et al. .............. 73/40.7 |

FOREIGN PATENT DOCUMENTS

| | | |
|---|---|---|
| DE | 10 2004/050419 A1 | 4/2006 |
| EP | 1 712 831 A | 10/2006 |
| JP | 52-138423 U | 11/1977 |
| JP | 60-255893 A | 12/1985 |
| JP | 08-132613 A | 5/1996 |
| JP | 2002-029701 A | 1/2002 |
| JP | 2003-155488 A | 5/2003 |
| JP | 2004-011167 A | 1/2004 |
| JP | 2004-111167 A | 4/2004 |
| JP | 2004-174462 A | 6/2004 |
| JP | 2004-311436 A | 11/2004 |
| JP | 2004-315566 A | 11/2004 |
| WO | WO 2005/112168 A | 11/2005 |

OTHER PUBLICATIONS

Machine Translation of DE 10 2004/050419.* Machine Translation of JP 2004/315566.*
English Translation of DE102004050419. Schreiber Tanslations, Inc. Sep. 2011.*
Office Action dated Sep. 26, 2011 of JP 2006-197941 and English translation thereof.

* cited by examiner

*Primary Examiner* — Timothy L Maust
*Assistant Examiner* — Timothy Kelly
(74) *Attorney, Agent, or Firm* — Kenyon & Kenyon LLP

(57) ABSTRACT

An in-vehicle hydrogen storage apparatus has a hydrogen gas filling passage connected from a hydrogen gas filling port up to the storage device that stores a hydrogen gas to be supplied to a fuel cell, and an odorizing agent supplying device that supplies an odorizing agent to hydrogen gas in at least one of the inside of the storage device and the inside of the hydrogen gas filling passage.

4 Claims, 7 Drawing Sheets

IN-VEHICLE HYDROGEN STORAGE APPARATUS

This is a 371 national phase application of PCT/IB2007/002048 filed 19 Jul. 2007, claiming priority to Japanese Patent Application No. 2006-197941 filed 20 Jul. 2006, the contents of which are incorporated herein by reference.

BACKGROUND OF THE INVENTION

1. Field of the Invention

The present invention relates to an in-vehicle hydrogen storage apparatus.

2. Description of the Related Art

A fuel cell generates electricity by causing an electrochemical reaction between hydrogen, which is a fuel gas, and oxygen, which is an oxidant. In a fuel cell vehicle, the running motor is driven by electrical power supplied from a fuel cell mounted aboard the vehicle.

Because hydrogen used as a fuel gas in a fuel cell is odorless, it is difficult to detect a leak of hydrogen, should such a leak occur when refilling a fuel cell vehicle with hydrogen gas to which an odorizing agent has not been added. Given this, an odorizing agent is added to hydrogen gas used in a fuel cell vehicle (refer to, for example, Japanese Patent Application Publications No. JP-A-2004-111167 and No. JP-A-2002-29701).

A fuel cell vehicle must be periodically refilled with hydrogen gas. There are hydrogen filling stations, however, that supply hydrogen gas without adding an odorizing agent to the hydrogen gas. There are also cases in which the odorizing agent added to the hydrogen gas is not suitable for a fuel cell mounted aboard a vehicle. If hydrogen gas, to which an appropriate odorizing agent has not been added, is supplied to a fuel cell vehicle, it could be difficult to detect leaks of hydrogen gas from a storage tank, for example, and operation of the fuel cell could be adversely affected. It is therefore necessary for a user to search for a hydrogen filling station that supplies hydrogen gas to which an appropriate odorizing agent has been added.

SUMMARY OF THE INVENTION

The present invention provides an in-vehicle hydrogen storage apparatus that stores hydrogen gas to which an odorizing agent has been added that is suitable for a fuel cell mounted aboard a vehicle.

One aspect of the present invention is an in-vehicle hydrogen storage apparatus mounted aboard a vehicle that supplies an odorizing agent to hydrogen gas in at least one of the inside of a storage device and the inside of a hydrogen gas filling passage. This aspect can store hydrogen gas to which an odorizing agent has been added that is suitable for a fuel cell mounted aboard a vehicle.

Specifically, this aspect is an in-vehicle hydrogen storage apparatus that has a hydrogen gas filling passage connected from a filling port of the hydrogen gas filling passage up to the hydrogen storage device; and an odorizing agent supplying device that supplies an odorizing agent to hydrogen gas in at least one of the inside of the storage device and the inside of the hydrogen gas filling passage.

The above-described in-vehicle hydrogen storage apparatus has an odorizing agent supplying device that supplies an odorizing agent to the hydrogen gas. The odorizing agent supplying device supplies an odorizing agent to hydrogen gas in at least one of the inside of the storage device and the inside of the hydrogen gas filling passage. This is because hydrogen gas with a desired odorizing agent added thereto may be stored in the storage device by either injecting the odorizing agent directly into the hydrogen gas in the storage device, or injecting the odorizing agent into the hydrogen gas upstream from the storage device.

The foregoing in-vehicle hydrogen storage apparatus may further have an acquisition device that acquires the flow amount of hydrogen gas supplied to the storage device; and a controller that controls the odorizing agent supplying device to supply odorizing agent in an amount corresponding to the acquired flow amount of hydrogen gas.

That is, to ensure that the odorizing agent is added to the hydrogen gas at a given concentration, the odorizing agent is supplied in an amount corresponding to the flow amount of hydrogen gas supplied to the storage device.

The above-described in-vehicle hydrogen storage apparatus may further have an acquisition device that acquires the accumulated flow amount of hydrogen gas supplied to the storage device; and a controller that controls the odorizing agent supplying device to supply odorizing agent in an amount corresponding to the acquired accumulated flow amount of hydrogen gas.

That is, to ensure that the odorizing agent is added based on the amount of hydrogen gas supplied to the storage device, the odorizing agent is added in an amount corresponding to the accumulated amount of hydrogen gas supplied to the storage device, thereby enabling the addition of the odorizing agent to the hydrogen gas based on the amount of hydrogen gas to be refilled.

The above-described device may further have a hydrogen pressure acquisition device that acquires the rate of pressure increase inside the storage device when hydrogen gas is being supplied; and a controller that controls the odorizing agent supplying device to supply odorizing agent in an amount corresponding to the acquires rate of pressure increase inside the storage device.

That is, to ensure that the odorizing agent is added to the hydrogen gas at a given concentration, the odorizing agent is supplied in an amount corresponding to the rate of pressure increase inside the storage device.

This aspect may further have a hydrogen pressure acquisition device that acquires the pressure change amount inside the storage device when hydrogen gas is being supplied; and a controller that controls the odorizing agent supplying device to supply odorizing agent in an amount corresponding to the acquired pressure change amount inside the storage device.

That is, to ensure that the odorizing agent is added based on the amount of hydrogen gas supplied to the storage device, the odorizing agent is supplied in an amount corresponding to the pressure change amount inside the storage device, thereby enabling addition of the odorizing agent to the hydrogen gas based on the amount of hydrogen gas to be refilled.

The above-described odorizing agent supplying device may include an electromagnetic valve that, when electrically powered, opens to supply odorizing agent to at least one of the inside of the storage device and the inside of the hydrogen gas filling passage.

That is, the odorizing agent is supplied by the opening and closing of the electromagnetic valve to supply the odorizing agent to the hydrogen gas in at least one of the inside of the storage device and the inside of the hydrogen gas filling passage, thereby enabling the supply of the odorizing agent to the hydrogen gas by opening the electromagnetic valve.

The above-described device may include a nozzle that opens at one end toward at least one of the inside the storage device and the inside of the hydrogen gas filling passage; an electrically powered heater, disposed in an intermediate part of the nozzle, which heats by being electrically powered, so as to generate bubbles in the odorizing agent, which is in a liquid state, that fills the inside of the nozzle, the bubbles causing injection of the odorizing agent positioned at the one end of the nozzle from the one end of the nozzle; and a piezoelectric element, provided at the one end of the nozzle, which contracts to open the one end of the nozzle when electrically powered, and which expands to block the one end of the nozzle when not electrically powered.

That is, a so-called thermal jet nozzle is used in an odorizing agent supplying device to enable adjustment of the amount of odorizing agent supplied to the hydrogen gas. The odorizing agent supplying device has a heater that generates bubbles by vaporizing the liquid odorizing agent, provided midway in the nozzle for injecting the odorizing agent into the hydrogen gas in at least one of the inside of the storage device and the inside of the hydrogen gas filling passage. By electrically powering the heater, part of the odorizing agent that fills the inside of the nozzle is vaporized and becomes bubbles. By generating bubbles within the nozzle, odorizing agent disposed further toward the one end of the nozzle than the bubbles is pushed outward from the one end of the nozzle toward at least one of the inside of the storage device and the inside of the hydrogen gas filling passage. By adjusting the heating time or amount of heat generated, the amount of supply of the odorizing agent to at least one of the inside of the storage device and the inside of the hydrogen gas filling passage is changed, thereby enabling adjustment of the amount of odorizing agent supplied to the hydrogen gas to at least one of the inside of the storage device and the inside of the hydrogen gas filling passage.

It is necessary to prevent the outflow to the storage device of residual odorizing agent inside the nozzle when odorizing agent is not being injected. To achieve this, a piezoelectric element is provided at the one end of the nozzle. A piezoelectric element has the property of expanding when not electrically powered and contracting when electrically powered. By controlling the electrical powering of the piezoelectric element, the one end of the nozzle is opened and closed. By doing this, when the odorizing agent is not being supplied to the hydrogen gas in at least one of the inside of the storage device and the inside of the hydrogen gas filling passage, it is possible to block the one end of the nozzle to prevent the outflow of the odorizing agent, and also to prevent the solidification of the odorizing agent.

Another aspect of the present invention is a hydrogen supplying system, having: the in-vehicle hydrogen storage apparatus with a constitution as described above, that includes a controller that controls the odorizing agent supplying device to supply odorizing agent in an amount corresponding to the flow amount of hydrogen gas; and a hydrogen filling station that supplies hydrogen gas to the storage device, wherein the hydrogen filling station includes an acquisition device that acquires a flow amount of hydrogen gas supplied to the storage device and a communication device that sends the flow amount of hydrogen gas acquired by the acquisition device to the controller by communication.

BRIEF DESCRIPTION OF THE DRAWINGS

The foregoing and further features, and advantages of the invention will become apparent from the following description of preferred embodiments with reference to the accompanying drawings, wherein like numerals are used to represent like elements, and wherein.

DETAILED DESCRIPTION OF EXAMPLE EMBODIMENTS

Embodiments of the present invention are described as examples below. The embodiments are but examples, and the present invention is not restricted thereby.

Figure 1:
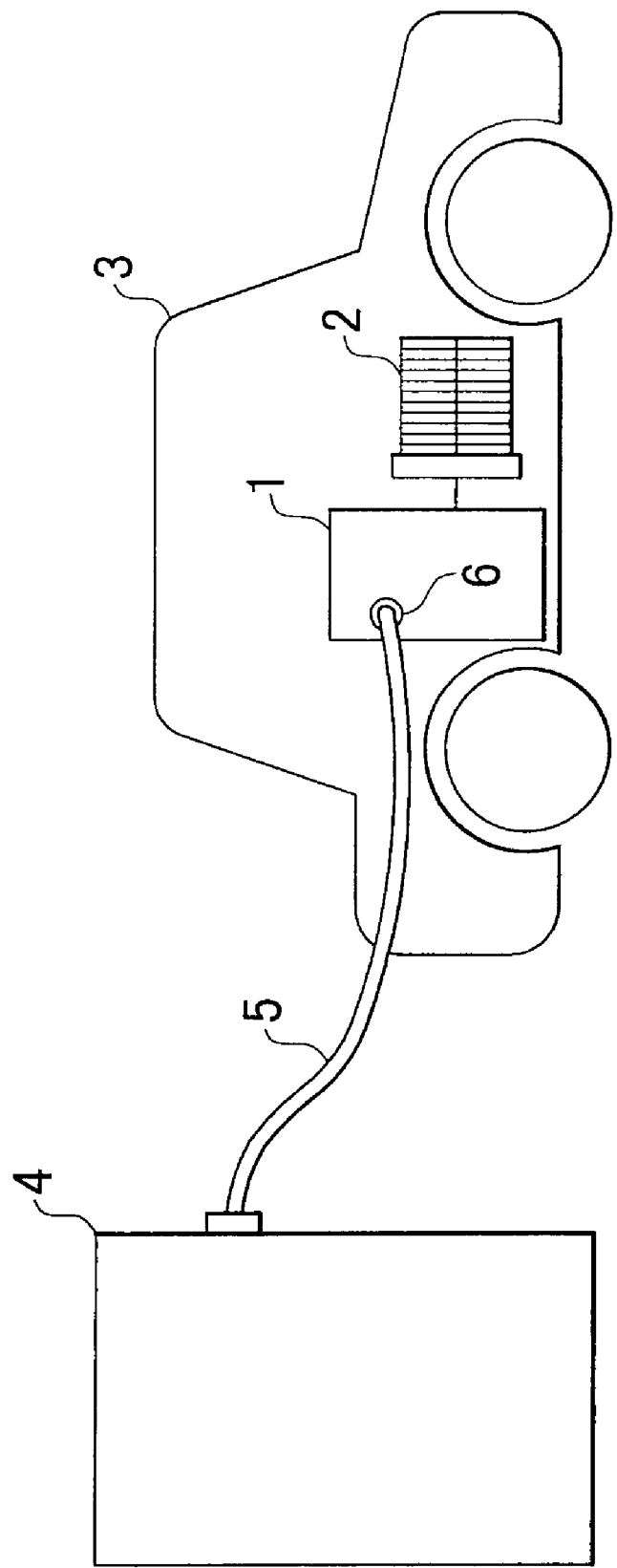
FIG. 1 is a simplified drawing showing a fuel cell vehicle on which an in-vehicle hydrogen storage apparatus is mounted according to an embodiment of the present invention is installed and a hydrogen filling station.

FIG. 1 shows in simplified form the overall general configuration of a fuel cell vehicle 3, aboard which are mounted in-vehicle hydrogen storage apparatus 1 and a fuel cell 2, and a hydrogen filling station 4 that supplies hydrogen for the fuel cell vehicle 3. As shown in FIG. 1, a hydrogen gas hose 5 that extends from the hydrogen filling station 4 is connected to a hydrogen gas filling port 6 of the in-vehicle hydrogen storage apparatus 1. The fuel cell 2 is linked to the in-vehicle hydrogen storage apparatus 1.

Figure 2:
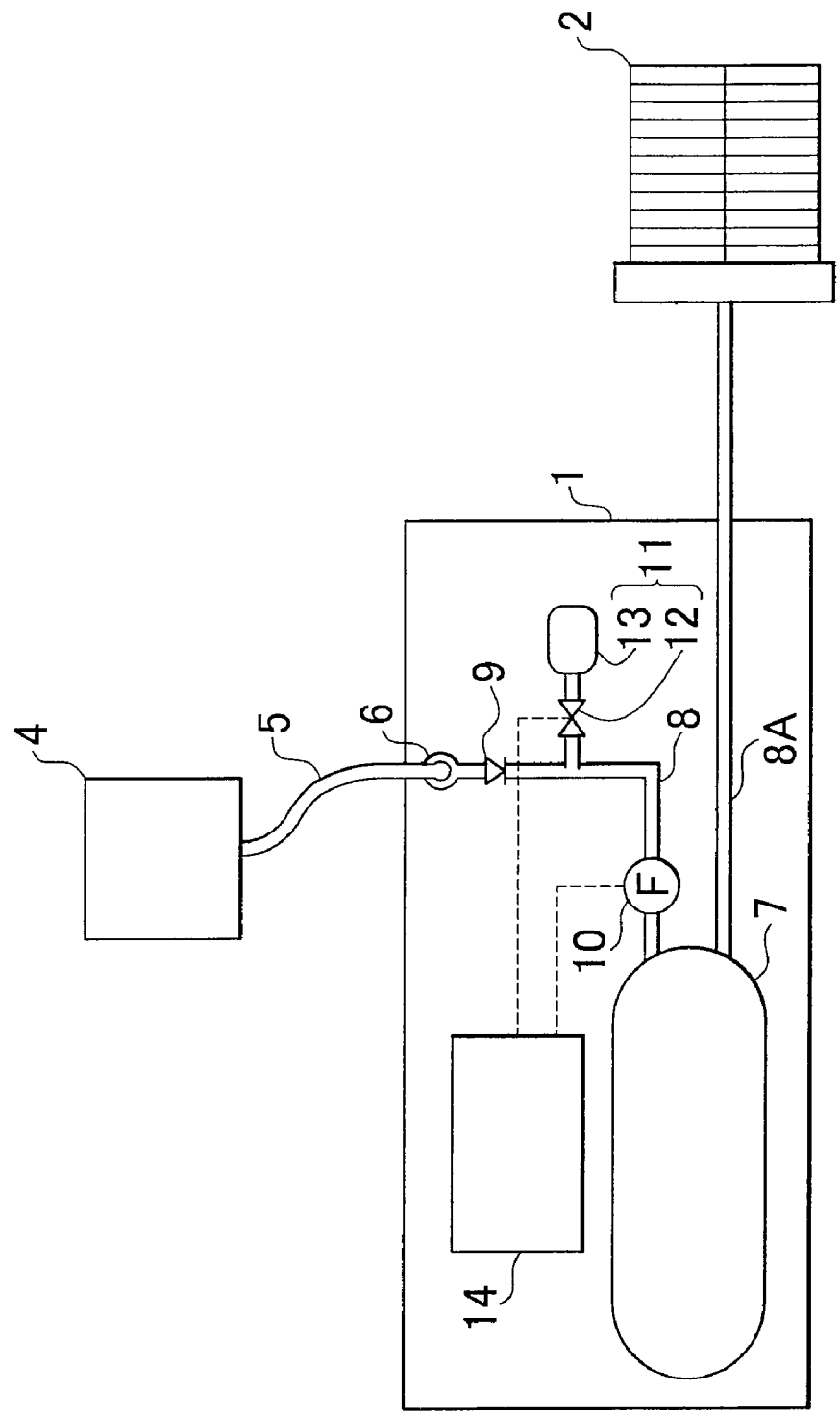
FIG. 2 is a drawing showing the configuration of an in-vehicle hydrogen storage apparatus according to the embodiment of the present invention.

FIG. 2 shows the configuration of the in-vehicle hydrogen storage apparatus 1. The in-vehicle hydrogen storage apparatus 1 has a hydrogen gas tank 7 (which may be regarded as a "storage device") that stores hydrogen gas. The filling port (inlet port) 6 for filling hydrogen gas is provided in the hydrogen gas tank 7 via a pipe 8 (which may be regarded as a "hydrogen gas filling passage"). A check valve 9 to prevent reverse flow of hydrogen gas from the hydrogen gas tank 7 to the filling port 6 and a flow meter 10 (which may be regarded as an "acquisition device") that detects the flow of hydrogen gas are provided midway in the pipe 8. The pipe 8 is provided with an odorizing device 11 (which may be regarded as an "odorizing agent supplying device"). The fuel cell 2 is connected via the pipe (hydrogen gas supplying passage) 8A downstream from the hydrogen gas tank 7.

The odorizing device 11 includes an electromagnetic valve 12 and an odorizing agent storage tank (odorizing agent storage section) 13. The odorizing agent storage tank 13 stores in advance an odorizing agent that is suitable for the fuel cell 2.

A controller 14 is connected to the flow meter 10 and the odorizing device 11 and controls the odorizing device 11 in response to a signal from the flow meter 10 (by opening and closing the electromagnetic valve 12). The controller 14 may be implemented as an electrical circuit and may alternatively be implemented as a computer having a CPU (central processing unit), a memory, and an I/O (input/output) interface and the like.

Figure 3:
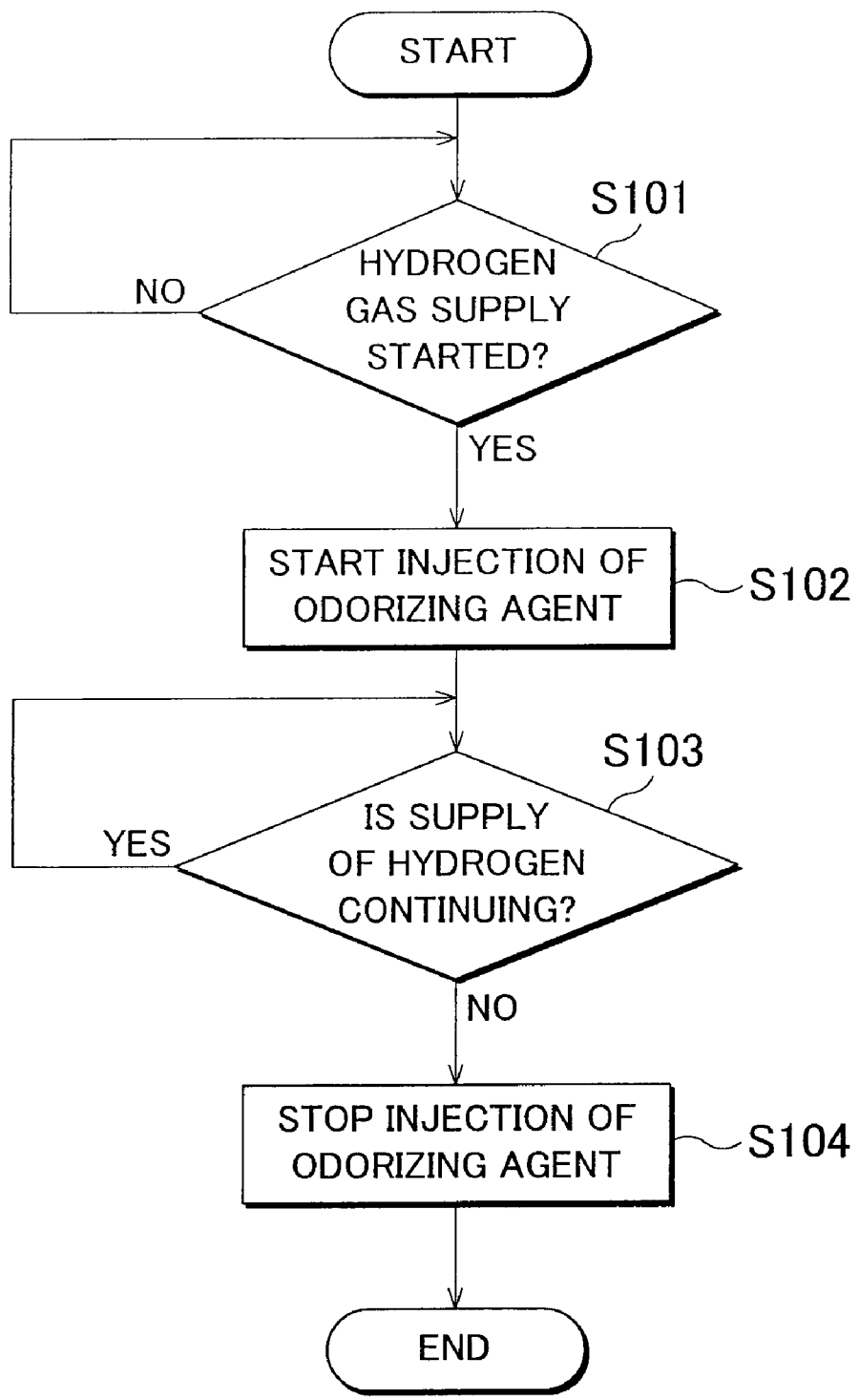
FIG. 3 is a flowchart of the control in the in-vehicle hydrogen storage apparatus according to the embodiment of the present invention.

The method of controlling the in-vehicle hydrogen storage apparatus 1 configured as described above is described below in detail with reference to the flowchart shown in FIG. 3.

When the in-vehicle hydrogen storage apparatus 1 is started, the controller 14 verifies, using the flow meter 10, whether hydrogen gas is supplied from the hydrogen filling station 4 (step S101). When the flow amount is detected by the flow meter 10, the electromagnetic valve 12 of the odorizing device 11 is opened and injection of the odorizing agent is started (step S102).

After the electromagnetic valve 12 is opened at step S102 and the filling of the odorizing agent is started, the controller 14 verifies whether the supply of hydrogen gas from the hydrogen filling station 4 is continuing, using the flow meter 10 (step S103). The supply of hydrogen gas is taken be continuing as long as a flow amount is detected, and the injection of the odorizing agent is continued while hydrogen gas is being supplied. When the flow amount is no longer detected, the electromagnetic valve 12 of the odorizing device 11 closes, and the injection of the odorizing agent ends (step S104).

By the above operation, the in-vehicle hydrogen storage apparatus 1 according to this embodiment stores, inside the hydrogen gas tank 7, hydrogen gas to which an odorizing agent suitable for the fuel cell 2 mounted aboard the fuel cell vehicle 3 has been added. Because hydrogen gas is stored in the hydrogen gas tank 7 in the condition in which the odorizing agent has been added thereto, compared with the case in which the odorizing agent is added downstream from the hydrogen gas tank 7, it is thus possible to detect leakage of hydrogen gas from the hydrogen gas tank 7.

Figure 4:
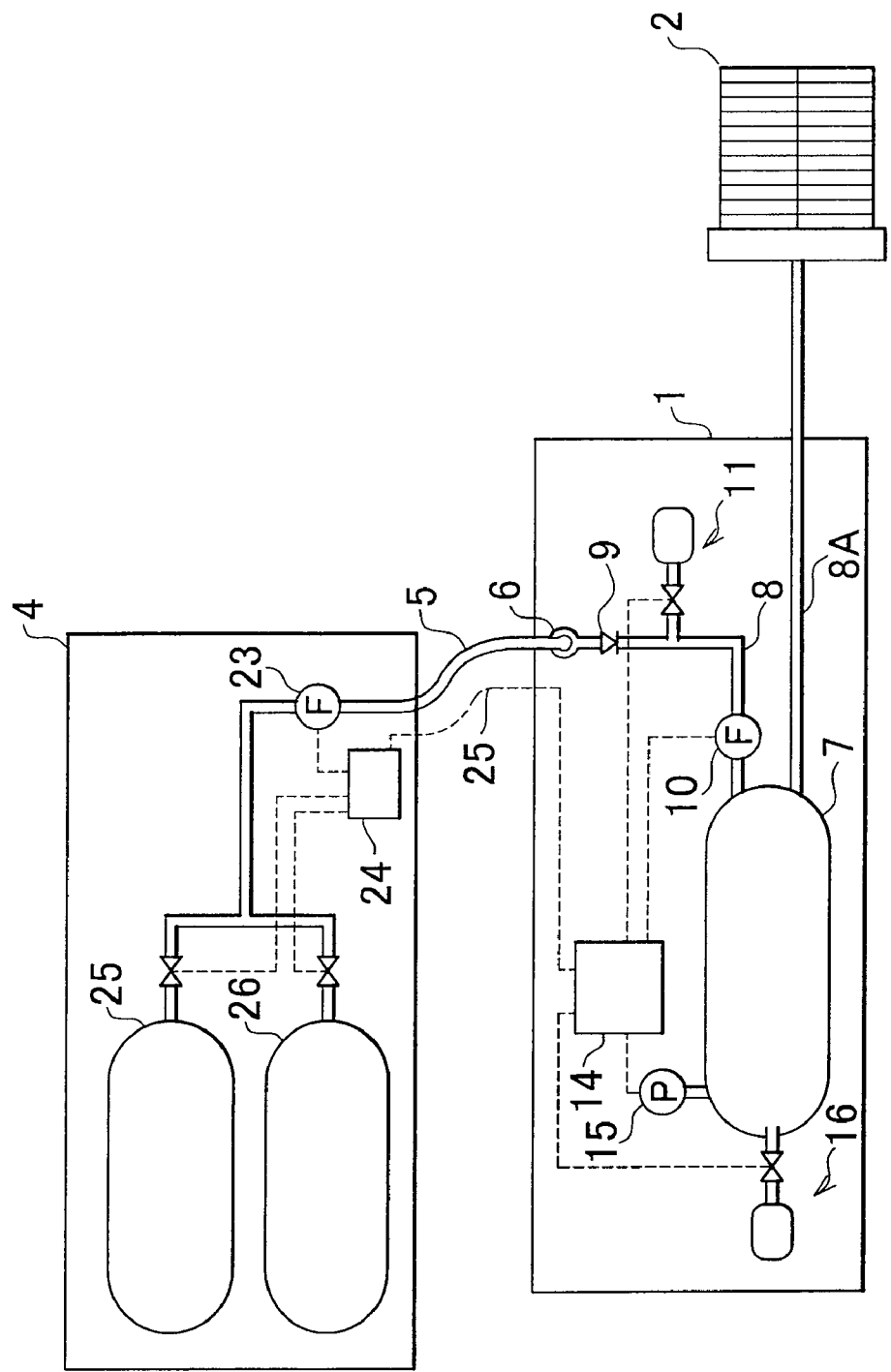
FIG. 4 is a drawing showing the configuration of an in-vehicle hydrogen storage apparatus in a variation of the present invention.

A variation of the above arrangement is possible. Although in the above-described embodiment, the flow of hydrogen gas is detected by providing the flow meter 10 midway in the pipe 8, as shown in FIG. 4, the first variation of the above-noted embodiment may detect the supply of hydrogen gas by providing a pressure gauge 15 in the hydrogen gas tank 7, thereby enabling elimination of the flow meter 10.

A second variation is also possible. Whereas the odorizing device 11 is provided midway in the pipe 8 as shown in FIG. 2, an odorizing apparatus 16 having the same configuration as the odorizing device 11 may be directly provided in the hydrogen gas tank 7 to directly inject an odorizing agent in the hydrogen gas tank 7, as shown in FIG. 4. By doing this, it is possible to add an odorizing agent to the hydrogen gas even if it is not possible to mount the odorizing device 11 to the pipe 8.

Yet a third variation is possible. Although in the above-described embodiment the odorizing agent is added without regard to the flow amount of the hydrogen gas to be filled, the amount of odorizing agent to be added may be adjusted in proportion to, for example, the flow amount of the hydrogen gas to be filled.

Figure 5:
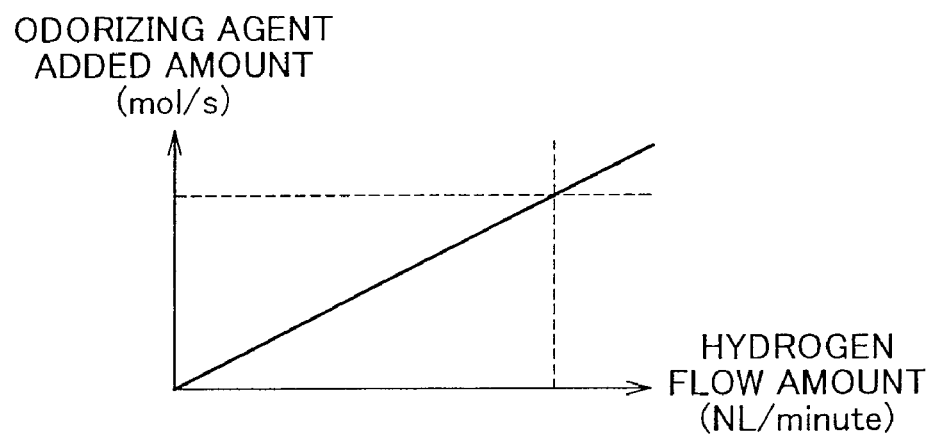
FIG. 5 is a graph showing the relationship between the odorizing agent added amount and the hydrogen flow amount in the variation of the present invention.
Figure 6:
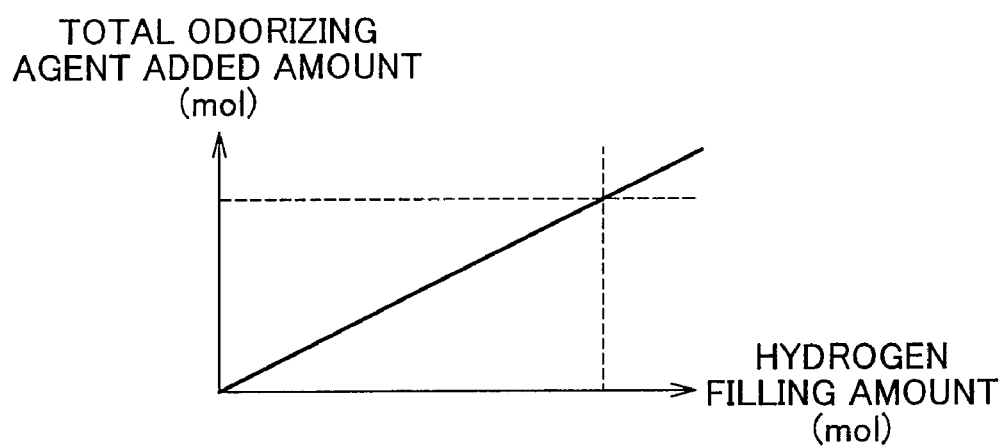
FIG. 6 is a graph showing the relationship between the total odorizing agent added amount and the amount of filled hydrogen in the variation of the present invention.
Figure 7:
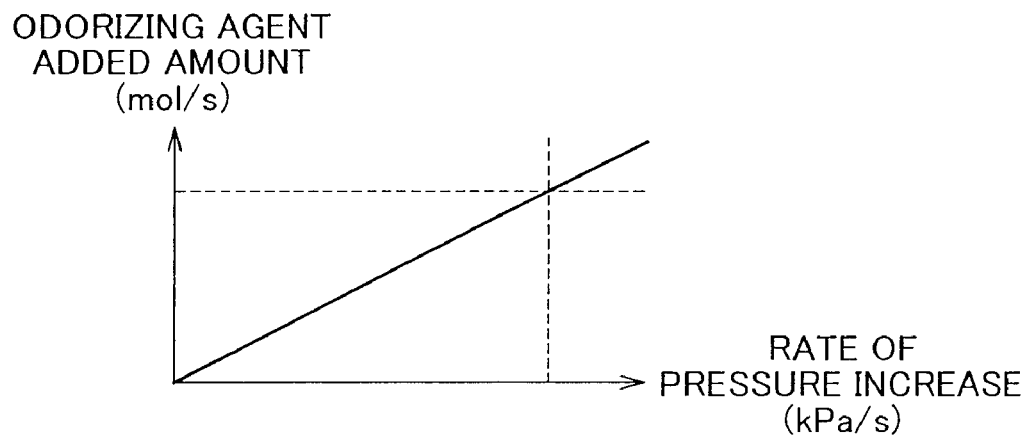
FIG. 7 is a graph showing the relationship between the added amount of odorizing agent and the rate of pressure increase in the variation of the present invention.
Figure 8:
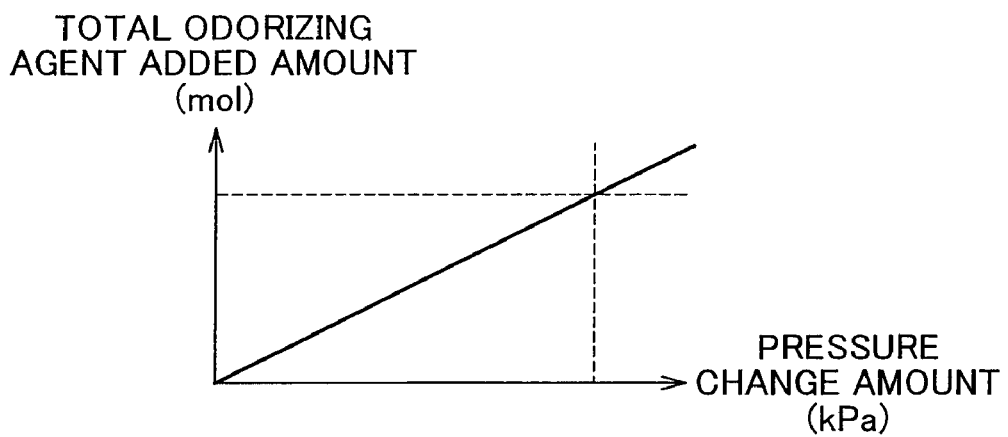
FIG. 8 is a graph showing the relationship between the total odorizing agent added amount and the pressure change amount in the variation of the present invention.

For example, as shown in FIG. 5, the flow amount of the hydrogen gas detected by the flow meter 10 (corresponding to the "hydrogen flow amount" shown in FIG. 5) and the amount of odorizing agent added to the hydrogen gas (corresponding to the "odorizing agent added amount" shown in FIG. 5) may be made directly proportional to one another. Also, as shown in FIG. 6, the accumulated flow amount of hydrogen gas detected by the flow meter 10 (corresponding to the "hydrogen filling amount" shown in FIG. 6) and the odorizing agent added amount to the hydrogen gas (corresponding to the "total odorizing agent added amount" shown in FIG. 6) may be made directly proportional to one another. Also, as shown in FIG. 7, the rate of pressure increase of the hydrogen gas detected by the pressure gauge 15 and the amount of odorizing agent added (corresponding to the "odorizing agent added amount" shown in FIG. 7) may be made directly proportional to one another. Also, as shown in FIG. 8, the pressure change amount of the hydrogen gas detected by the pressure gauge 15 and the amount of odorizing agent added (corresponding to the "total odorizing agent added amount" shown in FIG. 8) may be made directly proportional to one another. In this manner, the odorizing device 11 is controlled to achieve proportionality between flow amount and pressure, to adjust the injected amount of odorizing agent to be added. The adjustment of the injected amount of odorizing agent may be implemented, for example, by opening and closing the electromagnetic valve 12 little by little to change the opening and closing times thereof.

By adopting this type of configuration, it is possible to add an amount of odorizing agent to the hydrogen gas that is based on the amount of hydrogen gas being filled, and also possible to maintain a constant concentration of added odorizing agent with respect to the hydrogen gas.

Figure 9:
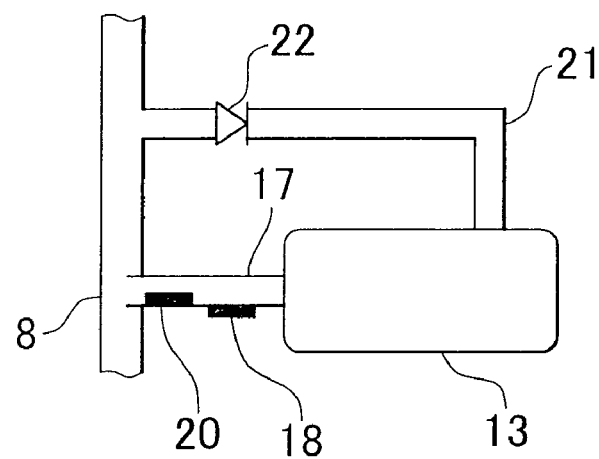
FIG. 9 is a drawing showing the configuration of an odorizing device of the variation of the present invention.
Figure 10:
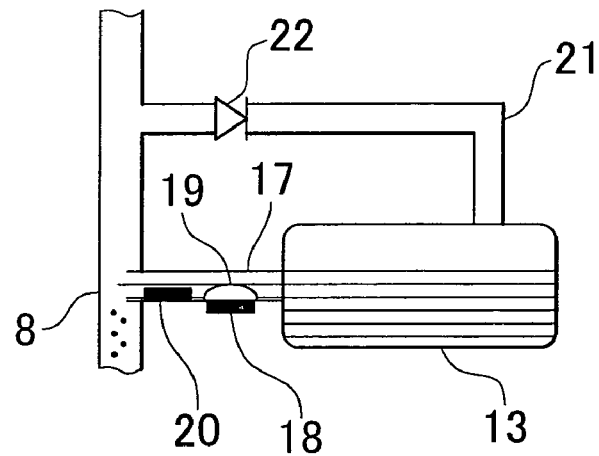
FIG. 10 is a drawing showing the configuration of an odorizing device of the variation of the present invention.

A fourth variation is possible. Although the above-described embodiment injects an odorizing agent by the odorizing device 11 opening and closing the electromagnetic valve 12, the following arrangement may be adopted. Specifically, as shown in FIG. 9, a nozzle 17 opening toward the pipe 8 is provided between the pipe 8 and the odorizing agent storage tank 13. A heater 18 is provided that vaporizes the liquid odorizing agent within the nozzle 17. The heater 18 is electrically powered at the time of step S102 in FIG. 3. By doing this, as shown in FIG. 10, because the liquid odorizing agent in the nozzle 17 is vaporized to reach the condition of the bubbles 19, the odorizing agent is injected into the pipe 8 from the end of the nozzle 17. This is a so-called thermal jet type injector. By doing this, it is possible to adjust the amount of odorizing agent supplied into the pipe 8. It is possible to adjust amount of odorizing agent that is injected by changing the size of the bubbles by changing the time that the heater 18 is electrically powered or by changing the magnitude of the current for electrical powering thereof. This is particularly advantageous when adding odorizing agent based on the amount of hydrogen gas, as in the third variation noted above. This variation may also be applied to the odorizing device 16 that is directly connected to the hydrogen gas tank 7.

As shown in FIG. 9, a valve 20 made of a piezoelectric element is provided at the end of the nozzle 17, which contracts when electrically powered to open the end of the nozzle 17, but which expands when not electrically powered to block the end of the nozzle 17. This prevents the outflow of the odorizing agent to the pipe 8 from the end of the nozzle 17 and prevents the solidification of the odorizing agent near the end of the nozzle 17 when the odorizing agent is not being injected. Control is performed so that the electrical power to the valve 20 is stopped to block the end of the nozzle 17 when the odorizing agent is not being added, and so that the valve 20 is electrically powered to open the end of the nozzle 17 when the odorizing agent is being added. The valve that closes when not electrically powered is generally known as a normally closed valve.

A fifth variation is also possible. If the pressure of the odorizing agent stored in the odorizing device 11 (that is, the pressure in the odorizing agent storage tank 13) is lower than the pressure of the hydrogen gas in the pipe 8 and in the hydrogen gas tank 7, it may not be possible to inject the odorizing agent into the hydrogen gas. Given this, as shown in FIG. 9, to prevent the pressure in the odorizing agent storage tank 13 from falling below the hydrogen gas pressure in the pipe 8 and hydrogen gas tank 7, a pressure-equalizing pipe 21 communicably connects the inside of the odorizing agent storage tank 13 and the hydrogen gas. A check valve 22 is provided in the pressure-equalizing piping 21 to prevent reverse flow from the odorizing agent storage tank 13 to the pipe 8. By doing this, because the pressure within the odorizing agent storage tank 13 does not fall below the pressure of the hydrogen gas within the pipe 8 or the hydrogen gas tank 7, it is possible to easily inject the stored odorizing agent into the pipe 8 or hydrogen gas tank 7. This variation may also be applied to the odorizing device 16 that is connected directly to the hydrogen gas tank 7. A hydrogen-permeable membrane that does not pass the odorizing agent components but passes only hydrogen may be provided instead of the check valve 22. By doing this, there is no residual pressure in the odorizing agent storage tank 13 even with repeated filling with hydrogen.

A sixth variation is also possible. Although in the above-described embodiment the controller 14 detects the filling of hydrogen gas from a hydrogen filling station 4 by a flow meter 10 or pressure gauge 15 provided in the in-vehicle hydrogen storage apparatus 1, the following variation of this embodiment may be adopted. Specifically, as shown in FIG. 4, the flow amount of hydrogen gas detected by a flow meter 23 provided at the hydrogen filling station 4 is acquired via a communication circuit 25 with a communication device 24. By doing this, it is not necessary to provide the flow meter 10 or pressure gauge 15 inside the in-vehicle hydrogen storage apparatus 1. Also, the communication device 24 may store the additive component data of the hydrogen, such as an odorizing agent, which is then acquired by the controller 14. Then, if the odorizing agent is not added to the hydrogen gas being supplied, the appropriate odorizing agent is not added, or the desired amount of odorizing agent is not added, the controller 14 controls the odorizing devices 11, 16 to inject the odorizing agent. By doing this, it is possible to add an appropriate odorizing agent to the hydrogen gas to be stored in the hydrogen gas tank 7. Also, when the controller 14 determines, from the component data acquired from the communication device 24, that the amount of the appropriate odorizing agent added to the hydrogen being supplied exceeds the desired amount, it controls the odorizing devices 11, 16 so that additional odorizing agent is not added to the hydrogen gas.

A seventh variation is further possible. By using the odorizing devices 11, 16, it is possible in the above-described embodiment to add an odorizing agent that is suitable for a fuel cell 2 mounted aboard the fuel cell vehicle 3. However, the controller may communicate the data indicating a prescribed odorizing agent to the communication device 24, which is installed in the hydrogen filling station 4 that includes a plurality of hydrogen tanks 25, 26 having different odorizing agent components of the added odorizing agent, so that hydrogen gas may be filled into the hydrogen gas tank 7 from the hydrogen tank in which the odorizing agent most suitable for the fuel cell 2 is added. By doing this, it is not necessary to provide an odorizing device 11 in the in-vehicle hydrogen storage apparatus 1 and it is possible to supply hydrogen gas that is suitable for the fuel cell 2.

The invention claimed is:

1. A hydrogen supply system, comprising:
    a storage device that stores hydrogen gas supplied to a fuel cell;
    a hydrogen gas filling passage that connects a filling port of the hydrogen gas filling passage to the storage device; and
    an odorizing agent supplying device that supplies an odorizing agent to the hydrogen gas in at least one of the inside of the storage device and the inside of the hydrogen gas filling passage;
    a controller programmed to control the odorizing agent supplying device to supply odorizing agent in an amount corresponding to the flow amount of hydrogen gas; and
    a hydrogen filling station that supplies hydrogen gas to the storage device, wherein the hydrogen filling station includes:
        an acquisition device that acquires a flow amount of the hydrogen gas to be supplied into the storage device; and
        a communication device that sends the acquired flow amount of hydrogen gas to the controller,
    wherein the hydrogen filling station includes a plurality of hydrogen tanks that contain hydrogen gas mixed with different odorizing agents, and
    the controller programmed to communicate data identifying a prescribed odorizing agent to the communication device, and is programmed to perform a control so that the storage device is supplied with hydrogen gas that includes the prescribed odorizing agent.

2. The hydrogen supplying system according to claim 1, wherein the communication device stores data identifying additives of the hydrogen gas provided by the hydrogen filling station, and wherein the controller acquires the data by communication and controls the amount of odorizing agent added to the hydrogen gas based on the acquired data.

3. The hydrogen supplying system according to claim 1, wherein the controller executes a control so that odorizing agent is not added to the hydrogen gas when an amount of odorizing agent contained in the hydrogen gas supplied to the storage device is greater than a prescribed value, the acquired data indicating the amount of odorizing agent.

4. The hydrogen supplying system according to claim 1, wherein the odorizing agent supplying device includes a normally-closed electromagnetic valve that, when electrically powered, opens to supply odorizing agent to at least one of the inside of the storage device and the inside of the hydrogen gas filling passage.

* * * * *